Dec. 22, 1925.

O. C. TRAVER 1,567,017

AUTOMATIC RECLOSING CIRCUIT BREAKER SYSTEM

Original Filed Jan. 19, 1922

Inventor:
Oliver C. Traver,
by Albert G. Davis
His Attorney

Patented Dec. 22, 1925.  BEST AVAILABLE COPY  1,567,017

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed January 19, 1922, Serial No. 530,442. Renewed July 8, 1925.

*To all whom it may concern:*

Be it known that I, OLIVER C. TRAVER, a citizen of the United States, residing at Schenectady, county of Schenectady, State of New York, have invented certain new and useful Improvements in Automatic Reclosing Circuit-Breaker Systems, of which the following is a specification.

My invention relates to automatic reclosing circuit systems and particularly to such systems in which a circuit breaker is arranged to be closed automatically to connect a source of direct current to a load circuit as soon as the load conditions are such that the circuit breaker can be closed without overloading the source.

Heretofore, it has been proposed to connect a high impedance in series with the load circuit when the circuit breaker is open and to control the closing circuit of the circuit breaker by means of a reclosing relay connected across the load circuit and arranged to be operated when the potential drop across the load resistance reaches a predetermined value. Inasmuch as the potential drop across the load resistance varies directly with the voltage of the source, it is evident that with this arrangement the amount of load resistance required to close the breaker varies inversely with the voltage of source and therefore the circuit breaker is held open for a longer time than it should be when the voltage is below its normal value and is closed before it should be when the voltage is above its normal value.

One object of my invention is to provide an automatic reclosing circuit breaker system of the type referred to in which the amount of load resistance required to close the breaker is either constant or varies directly with the voltage of the source so that the circuit breaker closes just as soon as the load conditions are such that the circuit breaker can close without overloading the source.

My invention will be better understood from the following description taken in connection with the accompanying drawing, and its scope will be pointed out in the appended claims.

Figure 1:
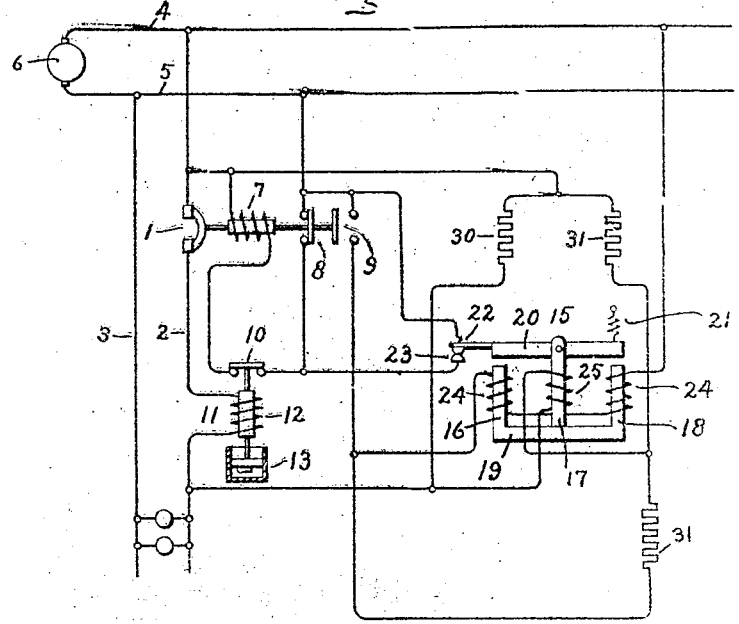
Figure 2:
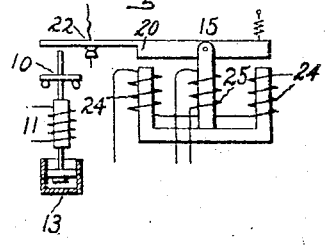

In the accompanying drawing Fig. 1 is a diagrammatic view of one embodiment of my invention, and Fig. 2 illustrates an arrangement for insuring the opening of the contacts of the reclosing relay when the circuit breaker opens in response to an overload.

Referring to Fig. 1 of the drawing, 1 represents a circuit breaker which is arranged to connect the conductor 2 of the load circuit 2, 3 to a conductor 4 of a supply circuit 4, 5 which is connected to a source of direct current shown as a direct current generator 6. The circuit breaker 1 which may be of any suitable type is shown as comprising a closing coil 7 which when energized maintains the circuit breaker in its closed position, an auxiliary switch 8, which is arranged to be closed when the circuit breaker is closed, and an auxiliary switch 9 which is arranged to be closed when the circuit breaker is open. The closing coil 7 is arranged to be connected across the supply circuit 4, 5 when the circuit breaker is closed by means of the contacts 10 of the overload relay 11 and the auxiliary contacts 8.

The overload relay 11 is provided with an operating winding 12 which is connected in series with the load circuit and which is arranged so that the relay operates to open its contacts 10 when the load current exceeds a predetermined value. The overload relay 11 is also provided with any suitable means such as the dash pot 13 whereby it opens its contacts 10 either instantly or after a predetermined interval when the load current exceeds the predetermined value, but does not close its contacts until a predetermined interval after the operating coil 12 is deenergized.

The circuit of the closing coil 7 is also controlled by means of a reclosing relay 15 which may be of any suitable construction. As shown in the drawing, this relay is constructed as a polarized relay and comprises a magnetic structure having three polar projections 16, 17 and 18, a common yoke 19 and an armature 20 pivotally mounted in front of the three polar projections. A spring 21 tends to maintain the armature in its closed position, in which position the contact 22, which is carried by the armature 20, is in engagement with the stationary contact 23. The magnetic structure may be either permanently magnetized or magnetized by a polarizing winding 24 which may be energized from any suitable source. As shown in the drawing, the winding 24 is arranged to be connected across the supply circuit 4, 5 by means of the auxiliary contacts 9 when the circuit breaker is opened. The polarizing winding 24 is equally distributed on the projections 16 and 18 and is arranged so that these projections are of opposite polarity. The polarized relay 15 is also provided with an operating winding 25 which is wound on the polar projection 17. One end of this winding is connected to one end of the resistor 30 which is connected in series with the load circuit when the circuit breaker is open. It is evident however that this end of the winding may be connected to any other point of the resistor 30. The other end of the operating winding 25 is connected to a tap on the resistor 31 which is arranged to be connected across the supply circuit 4, 5 by means of the auxiliary contacts 9 when the circuit breaker is open. It is apparent that the resistors 30 and 31 and the load resistance form a Wheatstone bridge and that the operating winding 25 is connected across opposite sides of the bridge so that the voltage impressed thereon is the difference between the potential drop across the lower portion of the resistor 31 and the potential drop across the load circuit 2, 3. With the circuit breaker open and a short circuit or overload on the load circuit the potential drop across the lower portion of the resistor 31 is greater than the potential drop across the load circuit and current that flows through the winding 25 due to this difference in potential is in such a direction that the polarity of the polar projections 17 is the same as the polarity of the polar projection 16 and is large enough to cause the armature 20 to move on its pivot in a direction to open the contacts 22 and 23. As the load resistance increases, the potential across the load resistance increases and therefore the potential across the winding 25 decreases. When the load resistance has increased to a predetermined value the winding 25 becomes sufficiently deenergized to allow the spring 21 to move the armature 20 into its closed position thereby closing the contacts 22 and 23.

The operation of this embodiment of my invention is as follows: Under normal operating conditions the overload relay contacts 10 are closed and the circuit breaker 1 is held in its closed position by the energization of the closing coil 7. The circuit of the closing coil 7 extends from the supply conductor 4 through the coil 7, overload relay contacts 10, auxiliary contacts 8 to the supply conductor 5. Since the auxiliary contacts 9 are open the circuits of the polarizing coil 24 of the reclosing relay 15 and of the resistor 31 are opened. The circuit breaker 1 also short circuits the operating coil 25 of the reclosing relay and upper portion of the resistor 31 so that the operating coil 25 is also deenergized. Consequently, the spring 21 holds the armature 20 of the reclosing relay in its closed position while the circuit breaker is closed.

In case of an overload or a short circuit on the load circuit 2, 3 the overload relay 11 operates and opens its contacts 10. The opening of these contacts deenergizes the closing coil 7 of the circuit breaker thereby opening the circuit breaker and its auxiliary contacts 8 and closing its auxiliary contacts 9. The closing of the auxiliary contacts 9 connects the resistor 31 and the polarizing coil 24 of the reclosing relay 15 across the supply circuit 4, 5. The opening of the circuit breaker 1 also opens the short circuit around the resistor 30 so that it is connected in series with the load circuit 2, 3. A small current now flows through the overload or short circuit and produces a small potential drop across the load circuit. This potential drop, however, is so much smaller than the potential drop across the lower portion of the resistor 31 that the potential across the operating winding 25 is sufficient to cause the relay 15 to move into its open position, in which position the contacts 22 and 23 are opened. In order to insure the opening of the contacts 22 and 23 it may be desirable in some cases to have the overload relay 11 move the armature 20 into its open position when an overload occurs. Fig. 2 shows one way in which this result may be obtained. As soon as the circuit breaker 1 opens, the operating coil 12 of the overload relay 11 is deenergized, but, due to the dash pot 13, it does not close its contacts 10 until a predetermined interval after the circuit breaker opens. The purpose of this time delay is to give the relay 15 time to operate and also to allow any motors or other dynamo electric machines which may be connected to the load circuit and which would tend to maintain a potential on the load circuit after the circuit breaker opens time to stop before the circuit breaker is reclosed.

As the load resistance increases the potential drop across the load circuit increases and the potential across the operating winding 25 of the reclosing relay 15 decreases. When the load resistance increases to a predetermined value the operating coil 25 becomes sufficiently deenergized so that the spring 21 moves the armature 20 into its closed position, in which position the circuit of the closing coil 7 is completed. This circuit extends from the supply conductor 4 through the closing coil 7, overload relay contacts 10, contacts 22 and 23 of the reclosing relay, to the supply conductor 5.

Since the potential drops across the lower portion of the resistor 31 and the load resistance vary directly with the potential of the supply circuit, it is evident that with a constant load resistance the potential across the winding 25 also varies directly with the potential of the supply circuit. Consequently, if the relay 15 were designed so that it would close its contacts when the current through the coil 25 became zero, the voltage of the supply circuit would have no effect upon the amount of load resistance required to reclose the breaker. If, however, the relay 15 is designed so that it closes its contacts before the current has decreased to zero, it is evident that if the voltage increases above its normal value, while the circuit breaker is open, the voltage across the operating winding 25 increases since the potential across the lower portion of the resistor 31 is greater than the potential across the load circuit 2, 3. Therefore, in order to increase the potential across the load circuit so that the reclosing relay 15 will close the closing circuit of the closing coil 7 the load resistance has to be increased above its normal reclosing value. Similarly, if the voltage decreases below its normal value, the voltage across the operating winding 25 decreases so that the load resistance does not have to increase to its normal reclosing value in order to reclose the breaker. Therefore, it is evident that by properly designing the relay 15, and using the proper values of resistance the amount of load resistance required to reclose the breaker may be either independent of the voltage of the supply circuit or made to vary directly with the voltage.

It will be noted that the relay 15 is a polarized relay. If an ordinary low potential relay were used instead of a polarized relay and the load resistance should increase to a high value, before the overload contacts 10 closed after the opening of the breaker, so that the potential drop across the load circuit is greater than the potential drop across the lower portion of the resistor 31, the reverse potential, if it were high enough, would operate the relay and cause it to open its contacts and prevent the circuit breaker from being closed although the load conditions were such that the circuit breaker should be closed. By using a polarized relay, this reverse potential merely tends to aid the spring 21 in holding the relay in its closed position.

While I have shown and described one embodiment of my invention, I do not desire to be limited thereto but seek to cover in the appended claims all those modifications which fall within the true spirit and scope of my invention.

What I claim as new and desire to secure by Letters Patent of the United States, is:

1. In an automatic reclosing circuit breaker system, the combination with a supply circuit, a load circuit connected to said supply circuit, a circuit breaker adapted to control the connection between said supply circuit and said load circuit and closing means for said circuit breaker, of load resistance responsive means for controlling said closing means, and means for causing the amount of the load resistance required to operate said load resistance responsive means to be either independent of or to vary directly with the voltage of said supply circuit.

2. In an automatic reclosing circuit breaker system, the combination with a supply circuit, a load circuit connected to said supply circuit, a circuit breaker adapted to control the connection between said supply circuit and said load circuit and closing means for said circuit breaker, of a resistance adapted to be placed in series with the load circuit when the circuit breaker is open, a second resistance adapted to be placed in parallel with said first resistance and said load circuit when the circuit breaker is open, and means responsive to the potential between a certain point of one of said resistances and a certain point of the other resistance and arranged to effect the operation of said closing means when the potential between said points is less than a predetermined value.

3. In an automatic reclosing circuit breaker system, the combination with a supply circuit, a load circuit connected to said supply circuit, a circuit breaker adapted to control the connection between said supply circuit and said load circuit and closing means for said circuit breaker, of a resistance adapted to be placed in series with the load circuit when the circuit breaker is open, a second resistance adapted to be placed in parallel with said first resistance and said load circuit when the circuit breaker is open and a relay for controlling said closing means having a coil connected between points of said resistances, said relay being arranged to effect the operation of said closing means when the difference in potential between said points is less than a predetermined value.

4. In an automatic reclosing circuit breaker system, the combination with a supply circuit, a load circuit connected to said supply circuit, a circuit breaker adapted to control the connection between said supply circuit and said load circuit and closing means for said circuit breaker, of a resistance adapted to be placed in series with the load circuit when the circuit breaker is open, a second resistance adapted to be placed in parallel with said first resistance and said load circuit when the circuit breaker is open, and a polarized relay for controlling said closing means having a coil connected between points of said resistances.

5. In an automatic reclosing circuit breaker system, the combination with a supply circuit, a load circuit connected to said supply circuit, a circuit breaker adapted to control the connection between said supply circuit and said load circuit and closing means for said circuit breaker, of a resistance adapted to be placed in series with the load circuit when the circuit breaker is open, a second resistance adapted to be placed in parallel with said first resistance and said load circuit when the circuit breaker is open, and a polarized relay for controlling said closing means having an operating winding connected between points of said resistances in such a manner that an increase in the load resistance causes the voltage impressed upon said operating winding to decrease from a predetermined value in one direction to zero and then increase in the opposite direction, said relay being arranged to maintain its contacts open only while the potential impressed across its operating winding exceeds a predetermined value in said first mentioned direction.

In witness whereof, I have hereunto set my hand this 18th day of January, 1922.

OLIVER C. TRAVER.